United States Patent [19]

Steinhauser

[11] Patent Number: 4,726,350
[45] Date of Patent: Feb. 23, 1988

[54] OUTDOORSMAN'S STOVE

[76] Inventor: Oli Steinhauser, 79 Rockinghorse Rd., Rancho Palos Verdes, Calif. 90274

[21] Appl. No.: 6,794

[22] Filed: Jan. 27, 1987

[51] Int. Cl.⁴ .............................................. F24C 5/20
[52] U.S. Cl. .................................. 126/38; 126/40; 126/44; 126/214 D
[58] Field of Search ............ 126/38, 9 R, 25 R, 25 A, 126/215–220, 41 R, 44.40, 39 R, 9 B, 214 D, 304 R, 305; 431/344

[56] References Cited

U.S. PATENT DOCUMENTS

| | | | |
|---|---|---|---|
| 166,767 | 8/1875 | Gorham | 126/38 |
| 3,933,146 | 1/1976 | Hastings | 126/38 |
| 4,177,790 | 12/1979 | Zenzaburo | 126/38 |
| 4,192,284 | 3/1980 | Vache | 126/38 |

FOREIGN PATENT DOCUMENTS

| | | | |
|---|---|---|---|
| 46701 | 12/1931 | Denmark | 126/220 |
| 278916 | 10/1927 | United Kingdom | 126/215 |
| 1582432 | 1/1981 | United Kingdom | 126/9 R |

OTHER PUBLICATIONS

REI Advertisement, "MSR Firefly Stove", 1983.

*Primary Examiner*—James C. Yeung
*Attorney, Agent, or Firm*—Allen A. Dicke, Jr.

[57] ABSTRACT

Outdoorsman's stove is light, compact, efficient, stands securely, and provides excellent support for a pot. The windscreen is cup-shaped, embraces the burner, is large enough to define a substantial heating area on the bottom of the pot, and holds the pot support. The windscreen is held slightly elevated on divergent legs. When not in use, the legs, pot support and burner demount and can be stored within the windscreen.

15 Claims, 3 Drawing Figures

OUTDOORSMAN'S STOVE

BACKGROUND OF THE INVENTION

This invention is directed to an outdoorsman's stove having a windscreen which is substantially the size of a pot, with divergent legs supporting the windscreen and with the windscreen holding the pot support.

For many people, one of today's pleasures is traveling away from the amenities of civilization and living with what one can carry along. Those who travel away from the established amenities include backpackers, rafters, hunters and fishermen, as well as those just going on a remote cookout. Quite often there is need to take along a stove for the heating of water or for cooking of food. The carrying of the stove is sometimes required by regulation and sometimes required by the lack of available fuel. In any event, such a stove must not only be light and compact for ease of carrying, but must also be a good, efficient stove so that cooking can be achieved thereon. The stoves available in the marketplace and those discussed in the prior art do not satisfactorily fulfill these combined requirements.

SUMMARY OF THE INVENTION

In order to aid in the understanding of this invention, it can be stated in essentially summary form that it is directed to an outdoorsman's stove which comprises a windscreen as its principal body structure. The windscreen is supported on divergent legs, and the windscreen in turn carries a pot support. The burner is positioned within the windscreen, and the spacing between the windscreen and the pot is such as to maximize heating efficiency.

It is thus an object and advantage of this invention to provide an outdoorsman's stove which is light, compact and stable and efficient to use.

It is another object and advantage of this invention to provide an outdoorsman's stove which is principally comprised of generally circular walls substantially the diameter of the pot together with a substantially closed bottom extending under the circular walls with legs to support the windscreen and a pot support whithin and carried by the windscreen so that a strong, stable stove is provided.

Other objects and advantages of this invention will become apparent from a study of the following portion of the specification, the claims and the attached drawings.

DESCRIPTION OF THE PREFERRED EMBODIMENT

Figure 1:
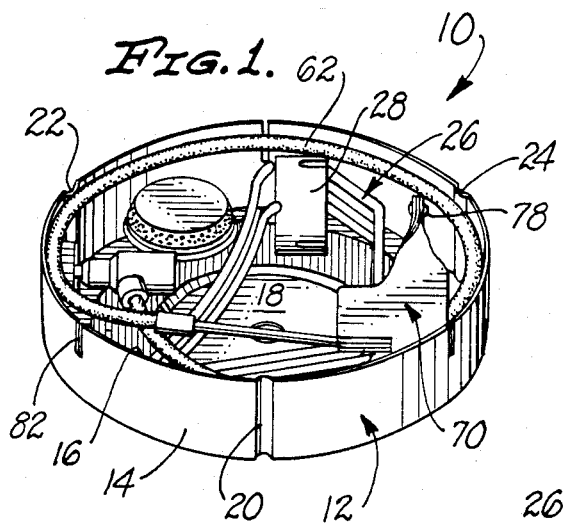
FIG. 1 is an isometric view of the outdoorsman's stove of this invention, showing the parts thereof stored within the windscreen.
Figure 2:
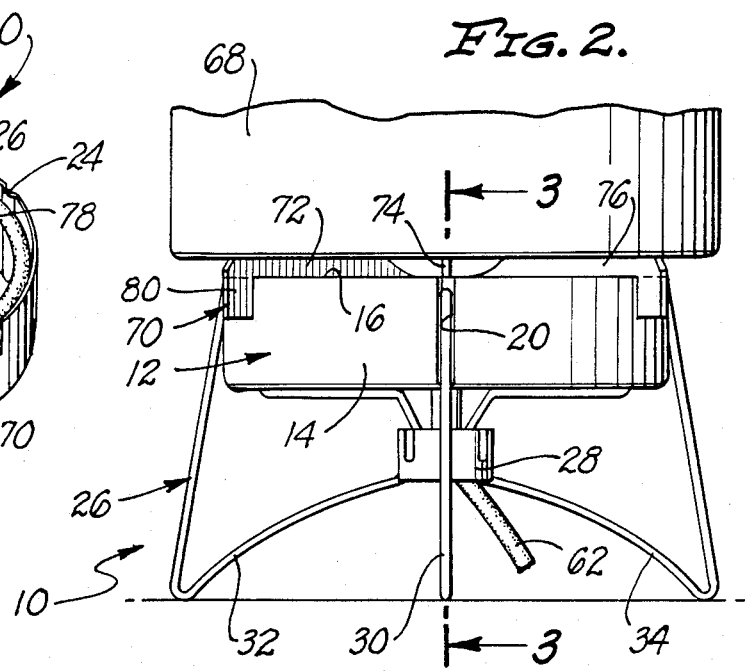
FIG. 2 is a side-elevational view of the outdoorsman's stove of this invention in its assembled condition, with a pot thereon and with a portion of the pot broken away.
Figure 3:
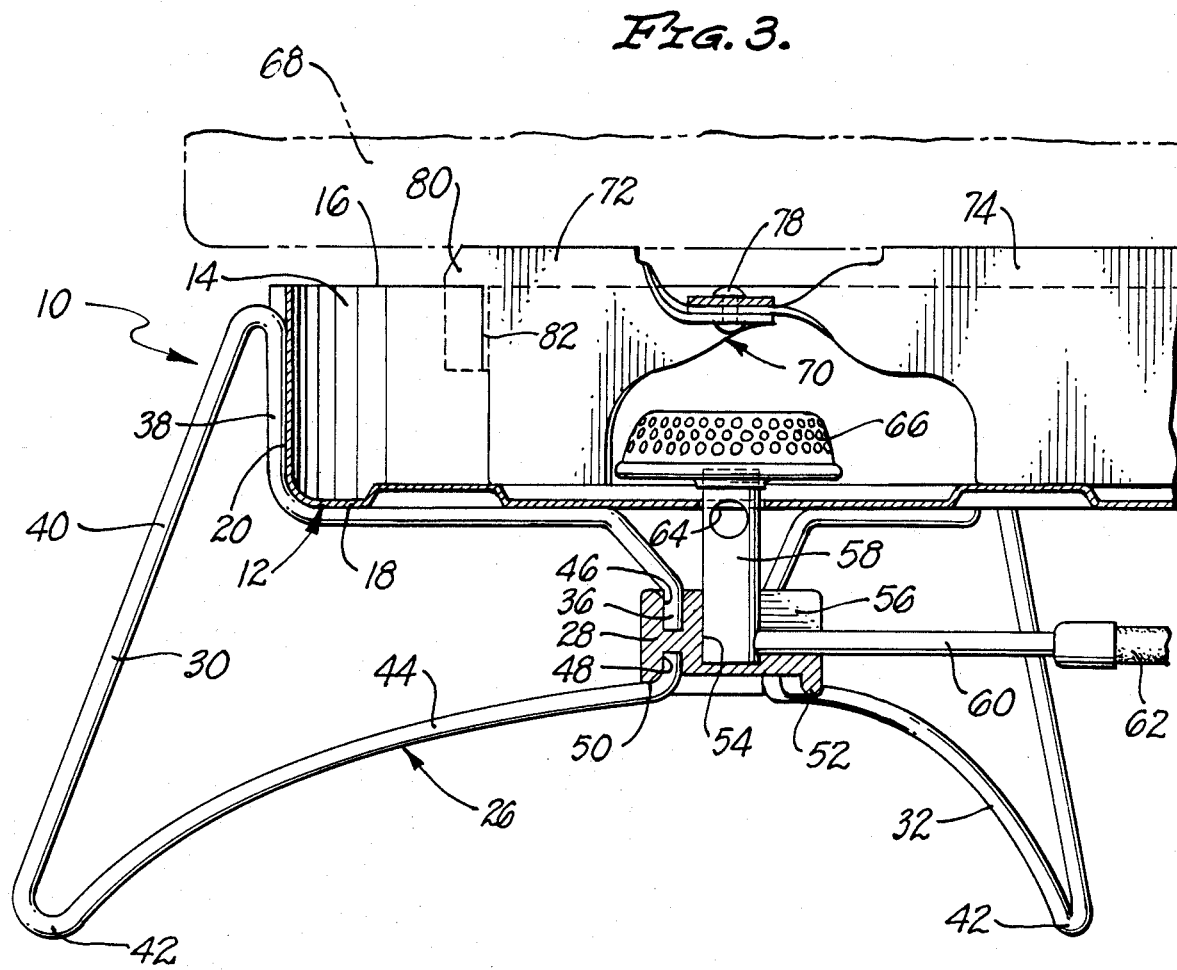
FIG. 3 is an enlarged section taken generally along line 3—3 of FIG. 2, with parts broken away.

The outdoorsman's stove of this invention is generally indicated at 10 in FIGS. 1, 2 and 3. One of the main structural elements of the stove 10 is windscreen 12. As is best seen in FIGS. 1 and 3, windscreen 12 has a substantially continuous, substantially circular upstanding sidewall 14. The configuration of sidewall 14 most closely resembles a tubular, circular cylinder terminating in a top at 16. Windscreen 12 is closed by bottom 18, which is substantially planar, which is integrally formed with the sidewall 14 and is joined thereto by means of a smooth curve. Windscreen 12 is drawn or spun of a light metal such as stainless steel in order to obtain and retain this configuration. Windscreen 12 thus has an axis which is substantially normal to the bottom 18 and is the axis of revolution around which the sidewalls 14 are configured. The bottom may have a strengthening annular recess. The windscreen is large, preferably about six inches in diameter, so that it defines a substantial area on the bottom of the pot which is subjected to the hot combustion gases and protected from the ambient wind so that good heat transfer occurs over a large pot area for excellent heating efficiency. Three recesses 20, 22 and 24 are depressed into the sidewall. These recesses are formed with a generally half-cylindrical wall which has an axis of revolution substantially parallel to the axis of the windscreen. The three recesses are equally spaced around the sidewall, at 120 degrees apart, as is indicated in FIG. 1.

When the outdoorsman's stove is in use, the windscreen 12 is supported on leg assembly 26, shown in FIGS. 2 and 3. Leg assembly 26 comprises body 28 in which three legs 30, 32 and 34 are mounted. The three legs are each formed of bent metal wire into a substantially closed loop. Each leg has an outwardly directed arm 36 which is curved into upstanding finger 38 which, in turn, is joined to outer element 40 by an acute bend so that the outer element 40 is outwardly divergent. The outer element 40 terminates in foot 42, which is joined back to the body by arm 44. Body 28 has upper and lower recesses 46 and 48 therein into which are inserted the inner ends of the arms 36 and 44. The recesses may be a single hole through the body or may be separate recesses as shown. When erected, the legs 30, 32 and 34 are at 120 degrees with respect to each other. In this orientation, one or the other of the arms of each leg may lie in a groove to resiliently restrain the legs into this erected position. For example, there is a groove 50 in the rim 52 on the bottom of body 28. The wire legs are resiliently stressed so that the arms are urged toward each other to hold the ends of the arms into the recesses in the body and to resiliently retain the lower arm 44 in its groove 50.

The leg assembly is sized so that, when the leg assembly is erected, the windscreen 12 rests upon the upper arms of each of the three legs, for example, arm 36 of leg 30. Furthermore, the space between the fingers of the three legs, for example finger 38, is such that these fingers respectively engage in recesses 20, 22 and 24. Leg assembly 26, when the legs are in the radially extended position from body 28, have an inscribed diameter inside the fingers which is smaller than the outside diameter of the generally circular sidewall 14. Thus, the legs are constrained to their 120 degree spaced angular position when the fingers are in the recesses. The inner ends of the arms 36 and 44 enter the recesses, as previously described, and are rotatable with respect to body 28 when released from groove 50. Thus, the three legs can lie substantially next to each other for compact storage, as seen in FIG. 1.

Body 28 also has a recess 54 of circular section and radial slot 56 extending therefrom to respectively receive burner body 58 and fuel tube 60. Fuel tube 60 is connected to fuel hose 62 which delivers gaseous fuel from a suitable fuel source. An orifice in burner body 58 regulates the fuel flow upwardly in the tubular body 58. Primary air is admitted at air inlet 64. The bottom 18 of windscreen 12 has an opening in the center thereof so that burner body 58 extends up into the windscreen. Within the windscreen, burner head 66 is screwed onto the upper portion of burner body 58 where it extends into the interior of the windscreen. Burner head 66 is designed so that, when it is lighted, the gas air mixture passing out of the perforations in the burner head hold flame at the burner head openings. In this way, heat is supplied to the interior of the windscreen.

A pot support is required to hold cooking pot 68 sufficiently above the top edge 16 of windscreen 12 to permit the secondary combustion air to enter the windscreen and to permit the products of combustion to pass out of the windscreen and along the bottom and sides of the cooking pot. Pot support 70 is formed of three identical flat panels. Panel 70 is seen in FIGS. 2 and 3; panel 74 is seen in FIG. 3; and panel 76 is seen in FIG. 2. The panels are made of sheet metal, preferably steel, and have substantially parallel top and bottom edges. The bottom edges lie on the top of bottom 16 of the windscreen, while the top edges extend slightly above the top edge 16 of the windscreen. The inner edges of each of the three panels is narrow and twisted so that the vertical rivet 78 secures the panels together in such a manner that they can swing from a position where they lie together in flat position to a position where they extend away from each other at substantially a 120 degree angle therebetween. In the closed position, the pot support may be easily stored, while in the open open, it stands in the windscreen and provides support for the pot 68. The panels each have an ear thereon, with ear 80 indicated for panel 72. The ear 80 extends radially outward beyond the periphery of the windscreen and lies in a slot 82 in the windscreen. As is seen in FIG. 1, there are three such slots, and each receives the outwardly extending ear of the windscreen. The engagement of the panels each in their respective slots holds the panels in the divergent position indicated to provide firm support for the cooking pot. As is seen in FIG. 1, the slots, including slot 82, are positioned at 60 degrees with respect to the recesses. The height panel extended above the windscreen, defines the space between the pot and the windscreen. That space should be sufficiently small to minimize the blowing of heat out of the space beneath the pot, but must be large enough to provide combustion air and escape of the products of combustion. As is seen in FIG. 3, the panels are cut away to receive therebetween the burner head 66. The panels of the pot support thus divide the products of combustion to assure that the heat is spread out on the bottom of the cooking pot.

Stove 10 is easily disassembled. After cooking is complete and the stove is cooled, the pot support is lifted out and folded flat. Thereupon, the burner head 66 is unscrewed from the top of the burner body 58. This permits lifting the windscreen 12 out of the legs. The legs are then folded, and the burner body can be lifted out of body 28 if it is a separate piece. All of the components are thereupon placed within the windscreen to provide compact storage. The various parts can be sized, configured, and made of such metal as to provide an outdoorsman's stove which is light and sufficiently strong for the purpose. The stove 10 thus provides a structure which has a broad base where its feet 42 touch the ground to maximize lateral stability. Furthermore, it has a large windscreen 12 so that a large area of the bottom of the pot is exposed to the products of combustion without being significantly blown away by local breeze. Cooking efficiency is very much increased by thus directing the heat onto the cooking pot area to be heated. The three panels in the pot support provide broad and secure support for the cooking pot for security thereof. In this way, an advantageous, lightweight portable outdoorsman's stove is provided.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A portable stove comprising:
   a windscreen, said windscreen having a substantially closed bottom and substantially continuous sidewalls to define a dish-shaped windscreen;
   support means for said windscreen, said support means comprising at least three legs engaged with said windscreen and extending downwardly from said windscreen and divergently from each other in the downward direction so as to support said windscreen on three legs which terminate in feet which are a greater distance apart than the width of said windscreen;
   a burner positioned within said windscreen; and
   a pot support, said pot support comprising at least three panels, said panels being hingedly mounted with respect to each other so that they can be folded substantially against each other for storage and spread out to form the pot support, each of said panels removably resting on the interior of said bottom of said windscreen and extending above said windscreen to support a pot above said windscreen, said windscreen having a plurality of slots therein and each of said panels having an ear thereon, said ears engaging in said slots to hold said pot support in position in said windscreen so that a pot supported on said pot support is positioned a small distance above said windscreen and said windscreen extends for a substantial area on the underside of the pot.

2. The portable stove of claim 1 wherein said windscreen has a substantially flat bottom with an opening therethrough, a burner body extending through said opening and a burner head mounted on said burner body and positioned within said windscreen, said burner body having a primary air inlet opening therein positioned below said windscreen.

3. The portable stove of claim 1 wherein said windscreen has a substantially flat bottom and said sidewalls of said windscreen are positioned substantially upright with respect to said bottom of said windscreen.

4. The portable stove of claim 3 wherein said stove has a central axis and said burner lies substantially on said central axis, said sidewals being substantially circular around said central axis.

5. The portable stove of claim 1 wherein said support means comprises three individual legs, each of said legs having an arm for positioning under said bottom and an upwardly extending finger for engaging the outside of said wall of said windscreen.

6. A portable stove having a central axis, comprising:

a windscreen, said windscreen having a substantially closed flat bottom and substantially continuous upright sidewalls substantially circular around said central axis to define a dish-shaped windscreen;

support means for said windscreen, said support means comprising three individual legs, each of said legs having an arm for positioning under said bottom and an upwardly extending finger for engaging the outside of said wall of said windscreen, recesses in the exterior of said sidewall of said windscreen so that said fingers of said legs can engage within said recesses to retain said legs;

a burner positioned within said windscreen substantially on said axis; and a pot support, said pot support comprising at least three panels, each of said panels resting on the interior of said bottom of said windscreen and extending above said windscreen to support a pot above said windscreen, said windscreen having a plurality of slots therein and each of said panels having an ear thereon, said ears engaging in said slots to hold said pot support in position in said windscreen so that a pot supported on said pot support is positioned a small distance above said windscreen and said windscreen extends for a substantial area on the underside of the pot.

7. A portable stove comprising:

a windscreen, said windscreen having a substantially closed bottom and substantially continuous sidewalls to define a dish-shaped windscreen;

support means for said windscreen, said support means comprising three individual legs, each of said legs having an arm for positioning under said bottom of said windscreen and an upwardly extending finger for engaging outside of said sidewalls of said windscreen, said sidewalls having spaced recesses therein, said recesses being sized and positioned to respectively receive said fingers on said legs to retain said legs in position, said legs extending downwardly from said windscreen and divergently from each other in the downward direction so as to support said windscreen on three legs which terminate in feet which are a greater distance apart than the width of said windscreen;

a burner positioned within said windscreen; and a pot support, said pot support comprising at least three panels, each of said panels resting on the interior of said bottom of said windscreen and extending above said windscreen to support a pot above said windscreen, said windscreen having a plurality of slots therein and each of said panels having an ear thereon, said ears engaging in said slots to hold said pot support in position in said windscreen so that a pot supported on said pot support is positioned a small distance above said windscreen and said windscreen extends for a substantial area on the underside of the pot.

8. The outdoorsman's stove of claim 7 wherein said legs are each pivotally mounted in a central hub, said central hub supporting said burner within said windscreen.

9. A portable stove comprising:

a cup-shaped windscreen having a substantially continuous bottom and a substantially continuous sidewall attached to said bottom;

at least three legs for engaging on and supporting said windscreen, said legs being downwardly divergent to provide feet at the bottom of said legs which extend over a greater area than said windscreen, said legs being demountable from said windscreen and foldable to fit within said windscreen;

a burner within said windscreen;

a pot support positioned partially within said windscreen and extending above said windscreen to carry a pot thereon spaced a small distance above said windscreen, said pot support having at least three panels hingedly mounted with respect to each other and being demountably supported on said windscreen and being foldable to store within said windscreen so that when demounted, said legs and said pot support can be stored within said windscreen.

10. The portable stove of claim 9 wherein the sidewalls of said windscreen are generally circular and there are at least three slots in said sidewalls adjacent the upper edge thereof, said pot support comprising at least three panels, with a panel engaged in each of said slots so that said pot support is held in place by engagement in said slots in said windscreen.

11. The portable stove of claim 10 including at least three recesses in said windscreen, there being at least three legs and each of said legs engaging in one of said recesses.

12. A portable stove comprising:

a cup-shaped windscreen having a substantially continuous bottom and a substantially continuous sidewall attached to said bottom, the sidewalls of said windscreen beinggenerally circular and at least three slots in said sidewalls adjacent the upper edge thereof;

at least three legs for engaging on and supporting said windscreen, said legs being downwardly divergent to provide feet at the bottom of said legs which extend over a greater area than said windscreen, said legs being demountable from said windscreen and foldable to fit within said windscreen;

a burner within said windscreen;

a pot support positioned partially within said windscreen and extending above said windscreen to carry a pot thereon spaced a small distance above said windscreen, said pot support comprising at least three panels, with a panel engaged in each of said slots so that said pot support is held in place by engagement in said slots in said windscreen, said panels of said pot support being pivoted together so that they may be removed from said slots in said windscreen and folded substantially flat with said panels substantially against each other so that when demounted said legs and said pot support can be stored within said windscreen.

13. A portable stove comprising:

a cup-shaped windscreen having a substantially continuous bottom and a substantially continuous sidewall attached to said bottom, said sidewall of said windscreen being generally circular, at least three slots in said sidewall adjacent the upper edge thereof, at least three recesses in said windscreen;

at least three legs for engaging on and supporting said windscreen, each of said legs engaging in one of said recesses, said legs being downwardly divergent to provide feet at the bottom of said legs which extend over a greater area than said windscreen, said legs each comprising a bent wire, said legs further including a hub in which said legs are pivoted, each of said legs having an upwardly extending finger which engages in one of said recesses in said windscreen, said legs being demountable from said windscreen and foldable to fit within said windscreen;

a burner within said windscreen;

a pot support positioned partially within said windscreen and extending above said windscreen to carry a pot thereon spaced a small distance above said windscreen, said pot support comprising at least three panels, with a panel engaged in each of said slots so that said pot support is held in place by engagement in said slots in said windscreen, said pot support being supported on said windscreen and being configured to store within said windscreen so that when demounted, said legs and said pot support can be stored within said windscreen.

14. The portable stove of claim 13 wherein each of said wire legs extends downwardly divergently from its finger to said foot to support said windscreen.

15. The portable stove of claim 14 wherein there is a burner body supported on said feet and there is an opening in said windscreen, said burner body extending into said windscreen with said burner attached thereto, said burner being detachable from said burner body so that said burner and said burner body can be demounted and stored within said windscreen.

* * * * *